(12) United States Patent
Shim et al.

(10) Patent No.: US 8,861,483 B2
(45) Date of Patent: Oct. 14, 2014

(54) METHOD FOR ALLOCATING A BEACON SLOT USING A BEACON TABLE IN WIRELESS PERSONAL AREA NETWORK (WPAN) AND WPAN DEVICE

(75) Inventors: Woo Jin Shim, Seoul (KR); Young Sik Shin, Seoul (KR); Yong Gil Park, Seongnam-si (KR); Jae Hwang Yu, Seoul (KR); Jong Tae Ihm, Seongnam-si (KR); Ho In Jeon, Seongnam-si (KR)

(73) Assignee: SK Telecom Co., Ltd. (KR)

( * ) Notice: Subject to any disclaimer, the term of this patent is extended or adjusted under 35 U.S.C. 154(b) by 181 days.

(21) Appl. No.: 12/524,483

(22) PCT Filed: Feb. 13, 2008

(86) PCT No.: PCT/KR2008/000848
§ 371 (c)(1),
(2), (4) Date: Jul. 24, 2009

(87) PCT Pub. No.: WO2008/100078
PCT Pub. Date: Aug. 21, 2008

(65) Prior Publication Data
US 2010/0111048 A1 May 6, 2010

(30) Foreign Application Priority Data

Feb. 13, 2007 (KR) ........................ 10-2007-0014826

(51) Int. Cl.
*H04W 40/24* (2009.01)
*H04W 74/04* (2009.01)
*H04W 48/12* (2009.01)
*H04W 72/12* (2009.01)
*H04W 84/18* (2009.01)

(52) U.S. Cl.
CPC ............ *H04W 74/04* (2013.01); *H04W 40/244* (2013.01); *H04W 48/12* (2013.01); *H04W 72/12* (2013.01); *H04W 84/18* (2013.01)
USPC ....................................... 370/336

(58) Field of Classification Search
CPC . H04W 84/18; H04W 84/12; H04W 72/0406; H04W 74/06; H04W 129/08423; H04W 129/08432; H04W 40/24; H04W 40/244; H04W 40/246; H04W 40/248
USPC ........... 370/329, 332, 336, 338; 455/445, 509
See application file for complete search history.

(56) References Cited

U.S. PATENT DOCUMENTS 7,529,205 B2 * 5/2009 Oh et al. ........................ 370/329
(Continued)

FOREIGN PATENT DOCUMENTS

| JP | 2006-135654 | 5/2006 |
|----|-------------|--------|
| JP | 2006-345414 | 12/2006 |

(Continued)

*Primary Examiner* — Joseph Bednash
(74) *Attorney, Agent, or Firm* — Baker Hostetler LLP (57) ABSTRACT

The present invention relates to a method and to a wireless personal area network (WPAN) device in which the device sets the beacon slot in the WPAN device and receives beacon slot information from neighbor devices, while setting the beacon table of the devices, to avoid the transmission time of the neighbor devices and the transmission time of the devices neighboring the neighbor devices in a WPAN. In the method, beacon message, including information about neighbors' transmission time and information about neighbors' neighbors' transmission time, is received from neighbor devices. The beacon message is combined, and the neighbors' transmission time information and the neighbors' neighbors' transmission time information are input into a beacon table. The neighbors' transmission time and the neighbors' neighbors' transmission time are input into a field for BTTSs to be avoided in the beacon table. The first beacon slot is set, as my beacon transmission slot, among beacon slots except for the transmission time input into the field for BTTSs to be avoided. Information about the set beacon transmission slot is input into a field for my BTTS in the beacon table.

4 Claims, 10 Drawing Sheets

(56) References Cited

U.S. PATENT DOCUMENTS

| | | | |
|---|---|---|---|
| 7,676,216 B2 * | 3/2010 | Stieglitz et al. | 455/410 |
| 8,121,080 B2 * | 2/2012 | Ham et al. | 370/329 |
| 8,254,342 B2 * | 8/2012 | Jeong et al. | 370/336 |
| 2002/0107023 A1 * | 8/2002 | Chari et al. | 455/445 |
| 2005/0192037 A1 * | 9/2005 | Nanda et al. | 455/509 |
| 2005/0249170 A1 * | 11/2005 | Salokannel et al. | 370/338 |
| 2006/0056365 A1 * | 3/2006 | Das et al. | 370/338 |
| 2006/0104241 A1 * | 5/2006 | Kim | 370/329 |
| 2007/0064655 A1 * | 3/2007 | Ruuska | 370/332 |
| 2008/0069013 A1 * | 3/2008 | Monier et al. | 370/277 |
| 2009/0238153 A1 * | 9/2009 | Sim | 370/336 |
| 2009/0279487 A1 * | 11/2009 | Reumerman et al. | 370/329 |
| 2011/0222435 A1 * | 9/2011 | Zou et al. | 370/254 |

FOREIGN PATENT DOCUMENTS

| | | | | |
|---|---|---|---|---|
| KR | 10-2006-0134525 | | 12/2006 | |
| KR | 10-2006-0134526 | | 12/2006 | |
| KR | 10-2008-0005010 | | 1/2008 | |
| KR | 10-2008-0005751 | | 1/2008 | |
| KR | 10-2008-0006108 | | 1/2008 | |
| KR | 10-2008-0052034 | | 6/2008 | |
| WO | 2005076543 A1 | | 8/2005 | |
| WO | WO 2006/120651 | * | 5/2006 | H04L 12/56 |
| WO | WO 2006/068621 A1 | * | 6/2006 | H04L 12/28 |
| WO | 2006/120651 A2 | | 11/2006 | |
| WO | 2006/120651 A3 | | 11/2006 | |

* cited by examiner

Fig. 3

PRIOR ART

Fig. 4

PRIOR ART

PRIOR ART

PRIOR ART

PRIOR ART

| Name | Value |
|---|---|
| MY DEPTH | X |
| MY BTTS | XXX |
| NEIGHBORS' BTTSs | A, B, C, D.... |

| DEVICE 1 | |
|---|---|
| NEIGHBORS (BTTSs) | X |
| NEIGHBORS' NEIGHBORS (BTTSs) | X |
| MY DEPTH | 0 |
| BTTS TO BE AVOIDED | X |
| MY BTTS (SET VALUE) | 1 |

| DEVICE 1 | |
|---|---|
| NEIGHBORS (BTTSs) | 2(2) |
| NEIGHBORS' NEIGHBORS (BTTSs) | X |
| MY DEPTH | 0 |
| BTTS TO BE AVOIDED | 2 |
| MY BTTS (SET VALUE) | 1 |

| DEVICE 2 | |
|---|---|
| NEIGHBORS (BTTSs) | 1(1) |
| NEIGHBORS' NEIGHBORS (BTTSs) | X |
| MY DEPTH | 1 |
| BTTS TO BE AVOIDED | 1 |
| MY BTTS (SET VALUE) | 2 |

Fig. 14

| DEVICE 1 | |
|---|---|
| NEIGHBORS (BTTSs) | 2(2),3(3) |
| NEIGHBORS' NEIGHBORS (BTTSs) | X |
| MY DEPTH | 0 |
| BTTS TO BE AVOIDED | 2,3 |
| MY BTTS (SET VALUE) | 1 |

| DEVICE 2 | |
|---|---|
| NEIGHBORS (BTTSs) | 1(1),3(3) |
| NEIGHBORS' NEIGHBORS (BTTSs) | X |
| MY DEPTH | 0 |
| BTTS TO BE AVOIDED | 1,3 |
| MY BTTS (SET VALUE) | 2 |

| DEVICE 3 | |
|---|---|
| NEIGHBORS (BTTSs) | 1(1),2(2) |
| NEIGHBORS' NEIGHBORS (BTTSs) | X |
| MY DEPTH | 1 |
| BTTS TO BE AVOIDED | 1,2 |
| MY BTTS (SET VALUE) | 3 |

METHOD FOR ALLOCATING A BEACON SLOT USING A BEACON TABLE IN WIRELESS PERSONAL AREA NETWORK (WPAN) AND WPAN DEVICE

TECHNICAL FIELD

The present invention relates, in general, to a method of setting a beacon slot using a beacon table in a Wireless Personal Area Network (WPAN) and to a WPAN device, and, more particularly, to a method of setting a beacon slot and a WPAN device, in which each device sets my beacon slot in consideration of the beacon transmission time slots of neighbor devices and devices neighboring the neighbor devices through the generation of a beacon table in a WPAN environment, thus enabling the beacon transmission time slots of other devices to be reused without causing collisions between beacons.

BACKGROUND ART

Wireless Personal Area Network (hereinafter referred to as 'WPAN') technology is one of the core technologies for ubiquitous networks in which persons, computers and objects are connected to each other through a single structure. A representative example of the application of WPAN technology is a sensor network, which functions to combine an existing sensor network environment with an actual physical environment.

A sensor network occupies an important role in realizing the ubiquitous generation. In particular, when ubiquitous networking is implemented in the home, it will provide a large incentive to construct national-level infrastructure, and thus the construction of a ubiquitous networking environment in the home is very significant. Further, home networking technology, which is one of the ubiquitous networking technologies, has emerged as a core technology for overcoming the serious situation in which existing markets for electric home appliances are rather depressed, in the ubiquitous generation, and a sensor network is central to such home networking technology.

It is predicted that a sensor network, expected to be composed of several hundreds or thousands of small sensor modules, will be applied to various fields, such as remote monitoring in intelligent home networks, automatic manufacturing process control, the administration of warehouse and physical distribution, remote patient monitoring in hospitals, and security systems for break-in detection.

Meanwhile, a WPAN can be used to implement such technology, and is characterized in that it has advantages, such as a transmission range of less than 10 m, low power consumption, and a size small enough to be mounted in a sensor or the like. Of such WPAN technologies, technology that is currently attracting attention includes ZigBee, which is low-speed and low-power WPAN technology. However, current ZigBee technology is limitedly applicable to networks and suffers from the instability of networks.

Figure 1:
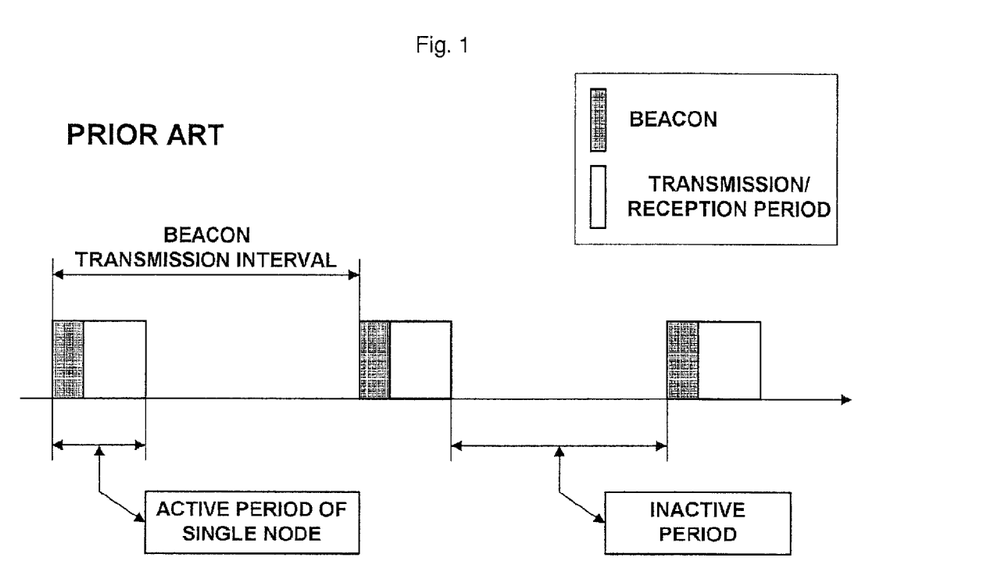
FIG. 1 is a diagram showing the transmission interval of beacons transmitted by a single node.

FIG. 1 is a diagram showing a transmission interval between beacons transmitted by a single node in ZigBee. A single node has a period during which data is transmitted or received after transmitting a beacon, and then has a sleep period in order to reduce power consumption. The intervals at this time are regularly designated and are equally applied to a next beacon transmission period, a next data transmission/reception period, and a next sleep period. That is, the beacon transmission period, the data transmission/reception period, and the sleep period are repeated at regular intervals.

During the sleep period, the transmission of data is possible, but the reception of data is impossible. The transmission of a beacon is required in order to connect a node below a reference node, so that the last node present in the configuration of a network does not require the transmission of a beacon after a certain period of time has elapsed.

Figure 2:
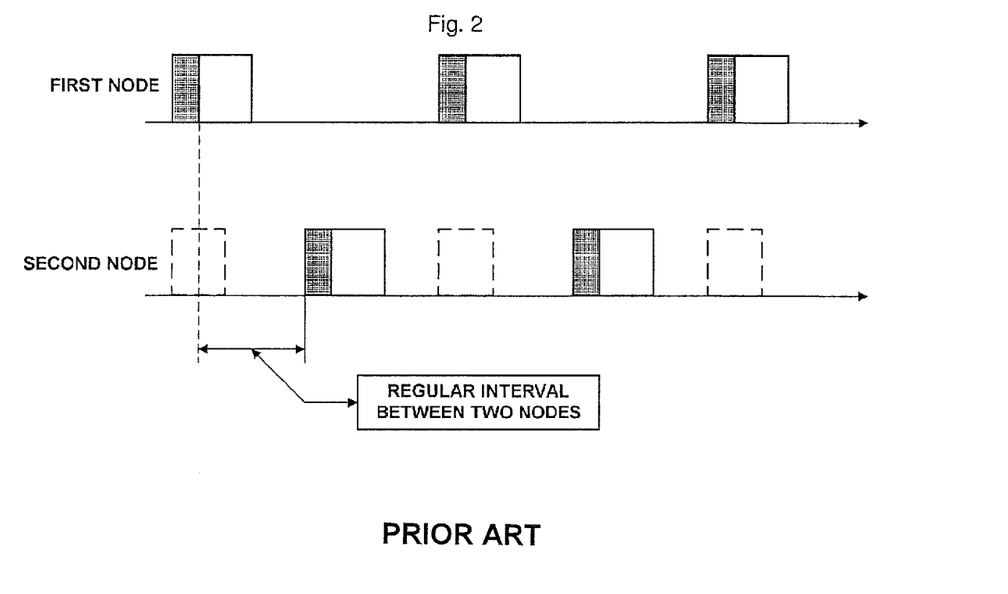
FIG. 2 is a diagram showing the status of transmission of beacons between two nodes.

FIG. 2 is a diagram showing the status of the transmission of beacons between two nodes occurring at the time of transmitting beacons between a first node and a second node. The first node transmits a beacon to the second node and transmits a time slot, ranging from the transmission of the beacon to the transmission of the next beacon, to the second node. The second node, having received the time slot, transmits its own beacon in the start section of the period, which is not used by the first node, in order to avoid collisions with the beacon transmitted by the first node.

Figure 3:
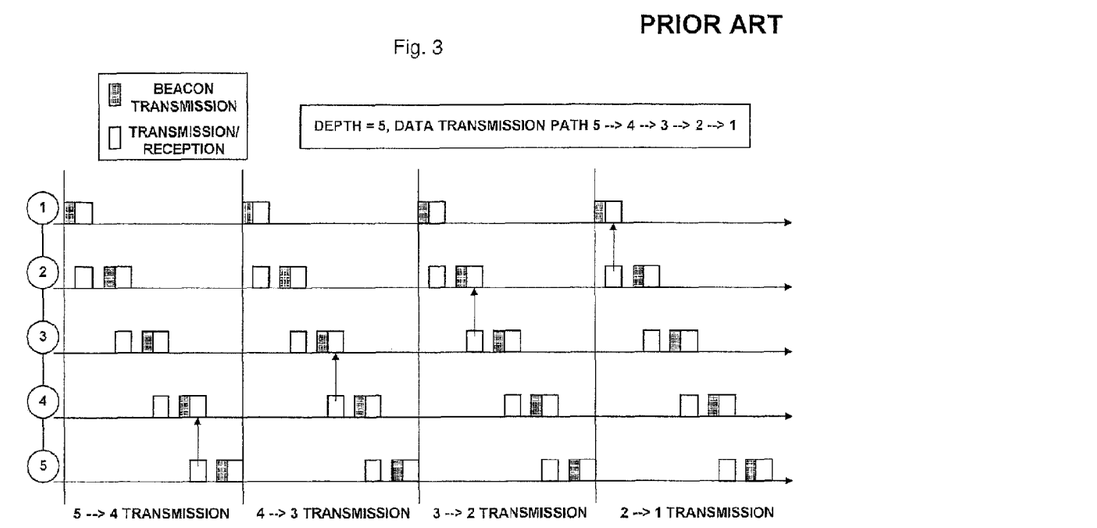
FIG. 3 is a diagram showing the inefficiency of data transmission in a conventional method of setting a beacon slot.

FIG. 3 is a diagram showing the inefficiency of data transmission in a conventional method of setting a beacon slot, in which the inefficiency of data transmission, occurring as nodes have a large depth when communication is performed by configuring beacon transmission time slots using the method of FIG. 2, is shown.

In network configuration in which the depth of nodes is 5, as shown in FIG. 3, when a fifth node attempts to transmit data to a first node, the data must be transmitted during the period in which a fourth node can receive data transmitted from the fifth node.

However, since the period in which the fourth node can receive data has already elapsed, the fifth node must wait for the next period in which the fourth node can receive data. As a result, since the time taken to transmit data up to the first node is increased by one cycle in this way, there is a problem in that the total transmission time increases.

Figure 4:
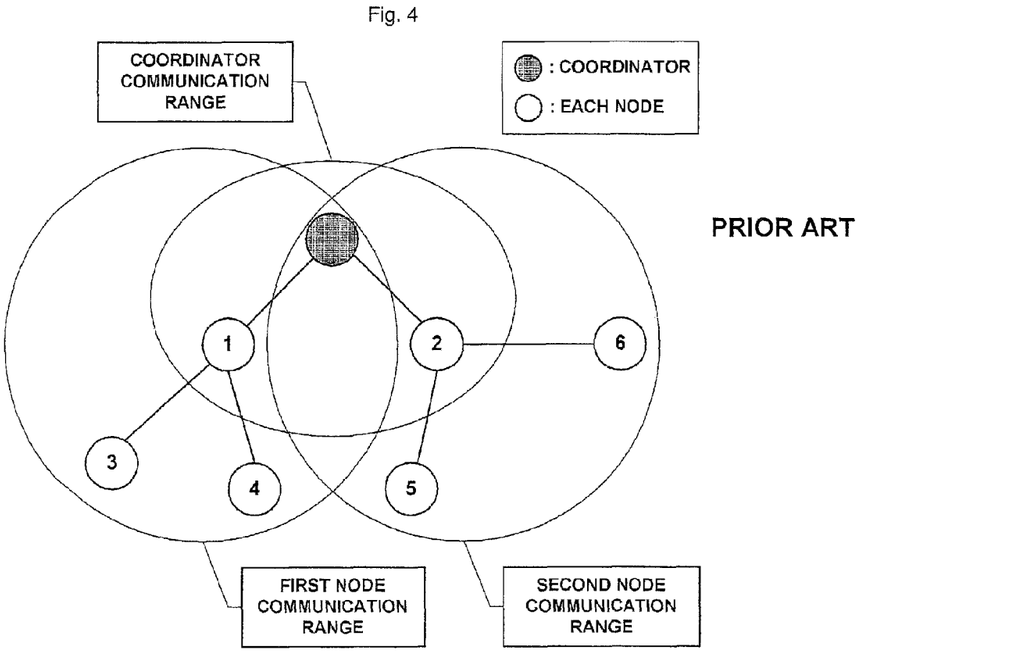
FIG. 4 is a network configuration diagram showing a conventional method of setting a beacon slot.

FIG. 4 is a network configuration diagram showing a conventional method of setting a beacon slot, in which a wireless network environment configured using the methods of FIGS. 1 and 2 is shown.

In the drawing, the WPAN environment is configured such that a coordinator has first and second nodes in its own communication range, and the first node and the second node have third and fourth nodes and fifth and sixth nodes in their own communication ranges, respectively.

Figure 5:
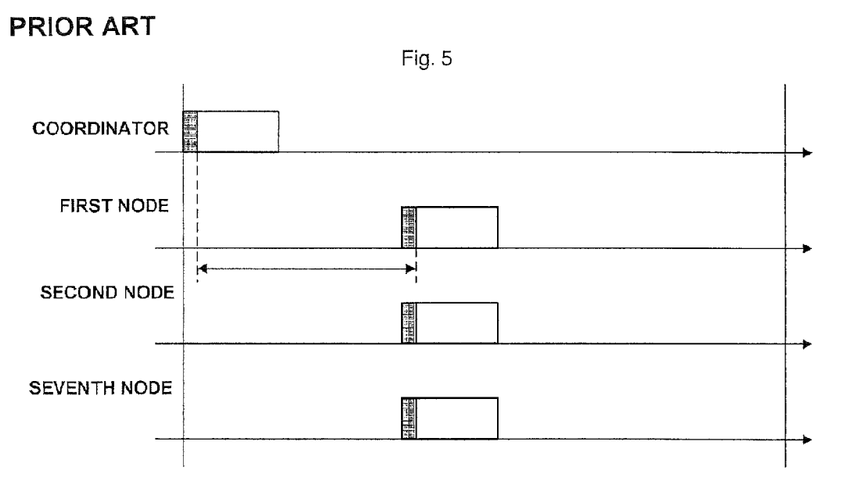
FIG. 5 is a diagram showing an example of the setting of a beacon slot in the network environment of FIG. 4.

FIG. 5 is a diagram showing an example of the setting of a beacon slot in the network environment of FIG. 4.

As shown in the drawing, in the case where the beacon transmission interval is configured using the method of FIG. 2 in the network environment of FIG. 4, when the first and second nodes perceive the beacon transmitted from the coordinator, the first and second nodes cannot recognize each other in their own communication ranges, and thus they transmit their beacons after the same interval has elapsed from the time point at which the coordinator transmits the beacon.

In this case, as described above, since the first and second nodes are not located in their communication ranges, there is no problem in transmitting beacons so as to set up connection to third, fourth, fifth and sixth nodes and perform data transmission even if the beacon transmission time slots of the first and second nodes are identical to each other. However, if another node appears and sets up a new connection, a collision between beacons may occur. This phenomenon is described in detail with reference to FIGS. 6 and 7.

Figure 6:
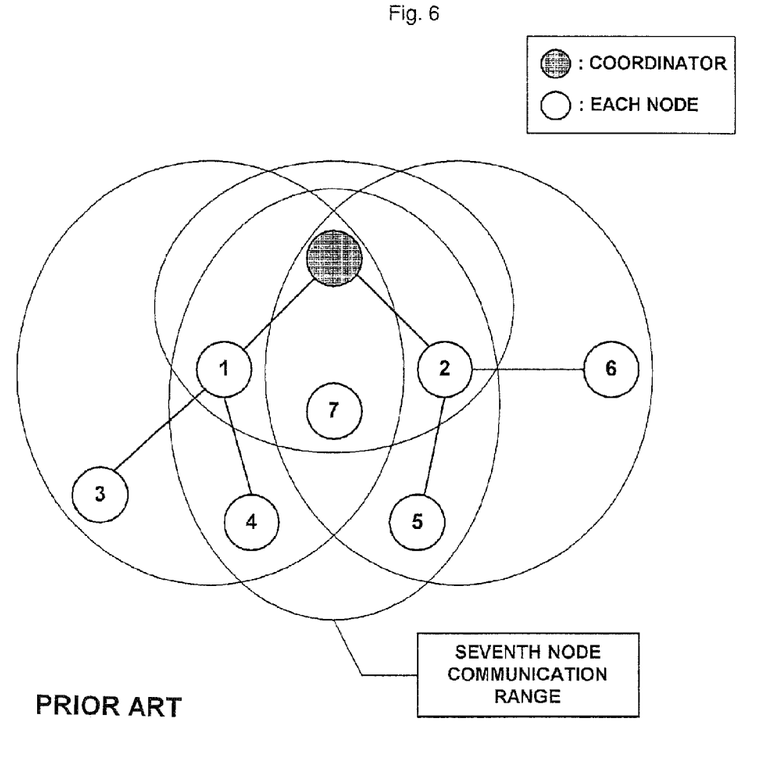
FIG. 6 is a diagram showing network configuration formed when a new node joins the network of FIG. 4.
Figure 7:
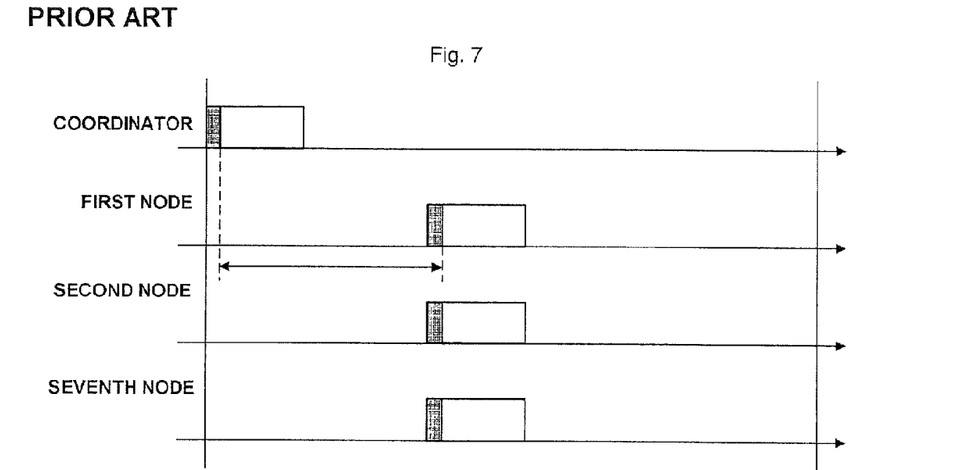
FIG. 7 is a diagram showing an example of the setting of a beacon slot in the network environment of FIG. 6.

FIG. 6 is a diagram showing network configuration formed when a new node joins the network of FIG. 4, and FIG. 7 is a diagram showing an example of the setting of a beacon slot in the network environment of FIG. 6.

As shown in FIG. 6, a seventh node, appearing and newly joining the network, enters the communication range of a coordinator, and the communication range of the seventh node includes first, second, fourth and fifth nodes.

In this case, when beacon transmission time slots are configured using the methods of FIGS. 2 and 5, the seventh node receives a beacon from the coordinator, and calculates my beacon transmission time slot. Therefore, the beacon transmission time slot of the seventh node is set as the same time as that of the first and second nodes, as shown in FIG. 7.

When the network is configured in this way, there is no problem in the communication between the coordinator and the first, second and seventh nodes because the first, second and seventh nodes need to receive only the beacon from the coordinator. However, when the seventh node is generated after the network of FIG. 4 has been configured, some problem may occur.

That is, as shown in FIG. 6, the communication range of the seventh node includes fourth and fifth nodes, and the beacon transmission time slot of the seventh node is identical to that of the first and second nodes. Accordingly, if the first, second and seventh nodes simultaneously transmit beacons, a beacon collision occurs in the third node because the first and seventh nodes simultaneously transmit the beacons, and occurs in the fourth node because the second and seventh nodes simultaneously transmit the beacons. Due thereto, there are disadvantages in that a previously configured network is broken and is prevented from performing communication, and thus it is impossible to configure a mesh network enabling a more powerful communication network to be formed in wireless communication for which various communication networks can be configured.

DISCLOSURE OF INVENTION

Technical Problem

Accordingly, in light of the above problems, an object of the present invention is to provide a method of setting a beacon slot in a WPAN and a WPAN device, to prevent collisions between beacons by managing the beacon transmission time slots of neighbor devices and the beacon transmission time slots of devices neighboring the neighbor devices, receiving beacon slot information from one or more neighbors of the WPAN device and beacon slot information from neighbors of each such neighbor;

excluding beacon slots, from all of the beacon slots received, which are used by the one or more neighbors and the neighbors of each such neighbors; and setting the beacon slot in the WPAN device from all of the received beacon slots which have beacon-only period except for excluded beacon slots.

Another object of the present invention is to provide a method of setting a beacon slot and a WPAN device, which prevent collisions between beacons from occurring even if a node having any communication range is generated at any location, thus realizing the stability of network configuration, which enable a beacon-only period to be reused by detecting a correlation between devices using a beacon table, without causing the size of a beacon-only period to infinitely increase as the number of devices increases, thus efficiently using limited data and a limited memory size, and which enable data transmission to neighbor devices through beacons by overcoming limited communication conducted only in a parent-child relationship, thus enabling a wireless mesh network to be configured.

Technical Solution

In accordance with an aspect of the present invention to accomplish the above objects, there is provided a method of setting a beacon slot by using beacon slot information of its neighbors and its neighbors' neighbors, comprising the steps of: receiving, from one or more neighbors, beacon slot information of the neighbors and the neighbors' one or more neighbors; deciding the beacon slots of the neighbors and the neighbors' neighbors as beacon slots to avoid; and setting its beacon slot among beacon slots of a beacon-only period which are not the beacon slots to avoid.

Preferably, the beacon slot information receiving step comprises the steps of: obtaining the beacon slot information of the neighbors from payload information of beacons transmitted from the neighbors; and transmitting, to the neighbors, a request for the beacon slot information of the neighbor's neighbors, and receiving a response to the request including the beacon slot information of the neighbor's neighbors.

Preferably, the beacon slot setting step comprises the steps of: excluding beacon slots earlier than a beacon slot of a parent device from the beacon slots which are not the beacon slots to avoid; and setting an earliest slot among beacon slots remained after the exclusion, as its beacon slot.

Preferably, the avoided slot setting step further comprises the step of: deciding a beacon slot of a coordinator as beacon slots to avoid.

Preferably, the avoided slot setting step further comprises the steps of: inputting the beacon slot information of the neighbors and the neighbors' one or more neighbors into a beacon table of the device; and inputting the beacon slots to avoid into the beacon table.

Preferably, the method further comprises the step of: receiving beacon slot information from a new neighbor, and updating the beacon slot information of neighbors inputted into the beacon table.

Preferably, the method further comprises the step of: transmitting its beacon slot information and its neighbors' beacon slot information to its neighbors.

Preferably, the method further comprises the steps of: transmitting its beacon slot information contained in a beacon payload; and receivinq a request for the beacon slot information of its neighbors from a new neighbor, and transmitting beacon slot information to the new neighbor in response to the request.

Preferably, the beacon payload further contains a depth value of the device in order to allow the new neighbor to be connected to a device having small depth value.

In accordance with a further aspect of the present invention to accomplish the above objects, there is provided a Wireless Personal Area Network (WPAN) device, comprising a communication unit for performing transmission and reception of beacons and data; and a control unit for receiving, from one or more neighbors, beacon slot information of the neighbors and the neighbors' one or more neighbors through the communication unit, and setting its beacon slot among beacon slots of a beacon-only period which are not the beacon slots of its neighbors and its neighbors' neighbors.

Preferably, the control unit obtains the beacon slot information of the neighbors from payload information of beacons transmitted from the neighbors, transmits, to the neighbors, a request for the beacon slot information of the neighbors' neighbors through the communication unit: and receives a response to the request including the beacon slot information of the neighbor's neighbors.

Preferably, the control unit sets an earliest slot among beacon slots of the beacon-only period, except for beacon slots earlier than a beacon slot of a parent device and the beacon slots of its neighbors and its neighbors' neighbors, as its beacon slot.

Preferably, the control unit sets its beacon slot among beacon slots of the beacon-only period, except for a beacon slot of a coordinator and the beacon slots of its neighbors and its neighbors' neighbors.

Preferably, the control unit transmits, through the communication unit, its beacon slot information and its neighbors' beacon slot information to its neighbors.

Preferably, the control unit receives, through the communication unit, a request for the beacon slot information of its neighbors from a new neighbor: and transmits, through the communication unit, a response to the request including the beacon slot information of its neighbors to the new neighbor.

Advantageous Effects

Accordingly, a method of setting a beacon slot using a beacon table in a Wireless Personal Area Network (WPAN) and a WPAN device according to the present invention are advantageous in that each device generates and manages a beacon table used to manage the beacon transmission time slots of neighbor devices and the beacon transmission time slots of devices neighboring the neighbor devices, so that the device can detect beacon transmission time slots to be avoided by it so as to prevent collisions between beacons, and can set my beacon transmission time slot, and so that beacon slots, used by devices having no correlation therebetween, can be reused.

Further, the present invention is advantageous in that, since each device transmits information about my beacon transmission time slot and the beacon transmission time slots of neighbor devices to surrounding devices, and sets my beacon slot on the basis of the transmitted information, each device can efficiently and independently set a beacon slot without requiring a separate beacon slot setting node.

Further, the present invention is advantageous in that, since each device sets my beacon transmission time slot in the interval after the beacon transmission time slot of a parent device, the delay of data flow, occurring when the device has a beacon transmission time slot earlier than that of the parent device, can be prevented, and in that, since collisions between beacons of respective devices do not occur even if a node having any communication range is generated at any location, the stability of network configuration can be realized.

Furthermore, the present invention is advantageous in that, since the correlation between devices is detected using a beacon table and a beacon-only period is reused, without causing the size of a beacon-only period to infinitely increase as the number of devices increases, limited data and a limited memory size can be efficiently used, and in that, since data transmission to neighbor devices can be performed through beacons, beyond limited communication conducted only in a parent-child relationship, a wireless mesh network can be configured.

BEST MODE FOR CARRYING OUT THE INVENTION

The above objects, technical construction, operation, and advantages of the present invention will be more clearly understood from the following detailed description, taken in conjunction with the accompanying drawings.

Figure 8:
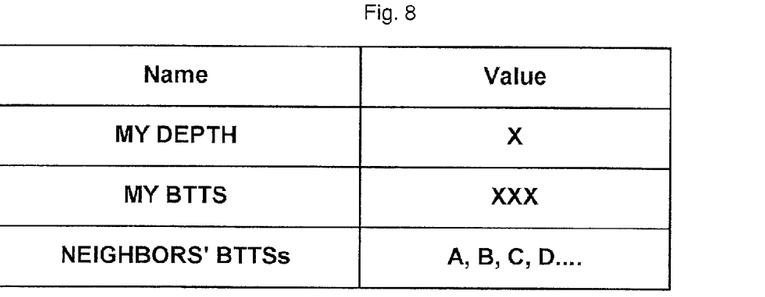
FIG. 8 is a diagram showing a beacon table transmitted or received by respective devices in a method of setting a beacon slot according to the present invention.

FIG. 8 is a diagram showing beacon scheduling information, transmitted or received between respective devices, in the form of a virtual table in a method of setting a beacon slot according to the present invention.

A Wireless Personal Area Network (WPAN) proposed in the present invention uses superframes, each having a beacon-only period during which two or more beacons are transmitted. Each of devices sets a beacon transmission time slot in which it will transmit a beacon, that is, a beacon slot, within the beacon-only period existing in the foremost part of the superframe. In this case, each device transmits or receives the beacon scheduling information of FIG. 8 to or from neighbor devices so as to set a beacon slot while avoiding collisions between beacons.

Of beacon scheduling information, the depth value of a relevant device (My Depth) indicates the number of hops by which a relevant device itself is spaced apart from the device that is generated first. This is a value used to allow the relevant device to be primarily connected to a device having a small depth value when connection between devices is set up. When the depth values of devices that can be connected are identical to each other, the relevant device is connected to the device having an earlier beacon transmission time slot.

A beacon transmission time value (My BTTS: Beacon Tx Time Slot) indicates the time at which the relevant device itself transmits a beacon, that is, a beacon slot. Each device sets a beacon transmission time slot while avoiding specific times using the beacon transmission time slots received from respective surrounding devices.

The beacon transmission time values of neighbor devices (Neighbors' BTTSs) indicate times at which nodes neighboring the relevant device itself transmit beacons.

The device desiring to set my beacon slot can obtain my depth value and my BTTS in the beacon scheduling information, with reference to the payload information of beacons transmitted by surrounding devices.

Further, in the beacon scheduling information, the neighbors' BTTSs can be obtained through corresponding response frames when the relevant device transmits a frame for requesting the neighbors' BTTSs, which is one of network command frames, to surrounding devices, and the surrounding devices, having received the request frame, return response frames, including the BTTSs of their neighbor devices, in response to the request frame.

For this purpose, each device must manage neighbors' BTTSs, as well as my BTTS, as beacon scheduling information.

As described above, each device obtains and combines beacon scheduling information of surrounding devices, and transmits my beacon in the BTTS which is not used by neighbor devices and the neighbors' neighbor devices, thus avoiding collisions between beacons.

Figure 9:
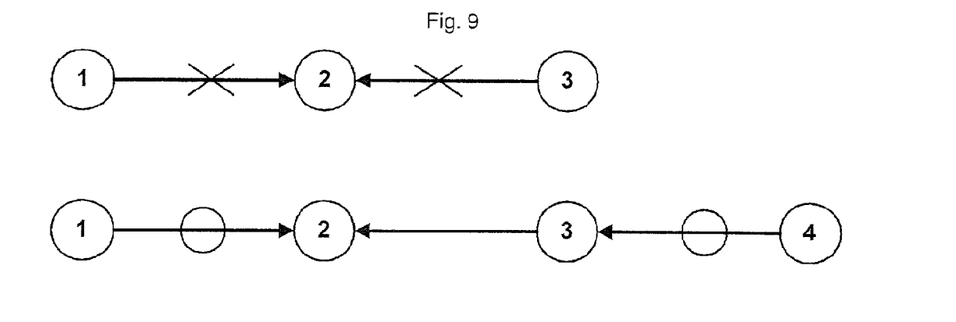
FIG. 9 is a conceptual diagram showing a method of setting a beacon slot according to the present invention.

As shown in FIG. 9, showing the conceptual diagram of the beacon slot setting method according to the present invention, the reason why a newly connected device must avoid neighbors' BTTSs and the neighbors' neighbors' BTTSs is that, if devices 1 and 3 transmit beacons at the same time, a collision between beacons occurs.

Therefore, when the device 1 must set a BTTS, the device 1 sets my BTTS to avoid the BTTS of the device 3, which is a device neighboring a device 2, while avoiding the BTTS of the device 2.

Further, in the devices 1 and 4, spaced apart from each other by three hops, a collision between beacons does not occur even if they transmit beacons at the same time, and thus the devices 1 and 4 can use the same beacon slot. Therefore, the present invention enables beacon slots, previously used by other devices, to be reused within a range in which collisions are avoided so as to improve the efficiency of data transmission.

Next, the method of setting a beacon slot according to the present invention will be described in detail below with reference to the examples of FIGS. 10 to 17.

Figure 10:
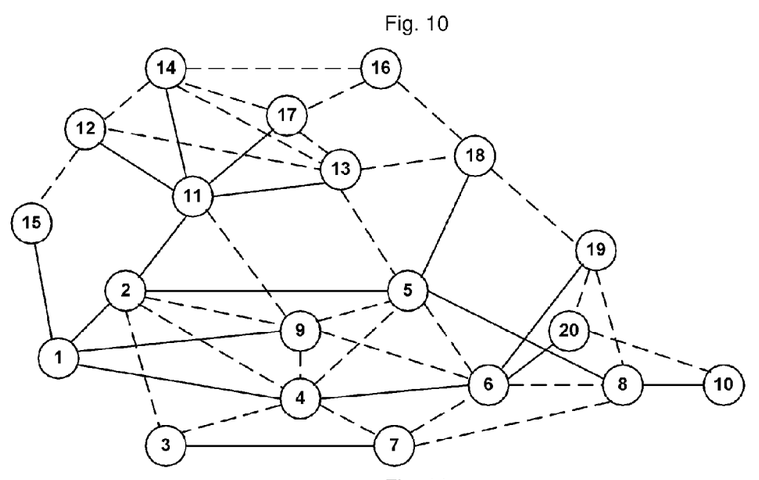
FIG. 10 is a network configuration diagram showing a method of setting a beacon slot according to the present invention.

FIG. 10 is a network configuration diagram showing a method of setting a beacon slot according to the present invention, in which the connection sequence of respective devices is designated in numerical order. A solid line indicates a parent-child relationship that permits connection and enables the configuration of the same network when a device, generated subsequently, requests connection. A dotted line indicates a relationship in which devices can directly exchange data with each other because they fall within radio communication ranges therebetween even if they do not have a parent-child relationship.

Figure 11:
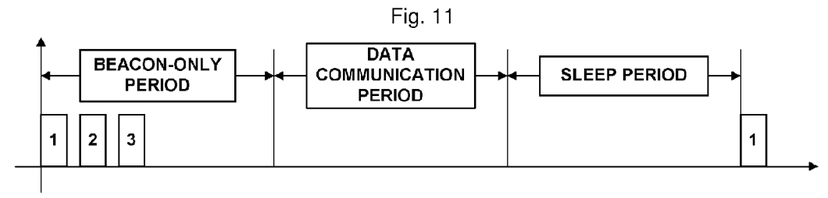
FIG. 11 is a diagram showing a beacon-only period.

FIG. 11 is a diagram showing a beacon-only period. As described above, the WPAN proposed in the present invention uses superframes, each having a beacon-only period during which a plurality of beacons is transmitted. The beacon-only period is located at the foremost part of the superframe. A data communication period, during which data is directly transmitted or received, and a sleep period are located after the beacon-only period.

The data communication period can be divided into a Contention Access Period (CAP) during which contentional communication is performed through a Carrier Sense Multiple Access-Collision Avoidance (CSMA-CA) mechanism, and a Contention Free Period (CFP) located after the CAP. The CFP is a period allocated when the end device of a network topology requests CFP from a higher device. When the CFP is not set, the entire data communication period is used as a CAP.

In the present invention, each device configures a beacon table by combining beacon scheduling information transmitted by neighbor devices, and sets a beacon slot, which is the time at which the device itself transmits a beacon, in the beacon-only period within the superframe with reference to the beacon table. This operation will be described below with reference to FIGS. 12 to 17.

Figure 12:
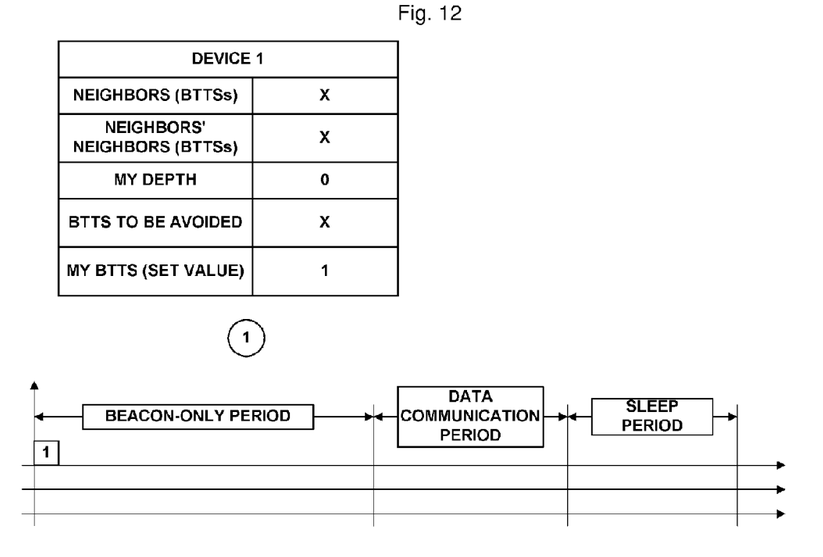
FIG. 12 is a diagram showing a method of setting the beacon slot of a device 1 in the network of FIG. 10.

FIG. 12 is a diagram showing a method of setting the beacon slot of a device 1 in the network of FIG. 10, in which the beacon table of the device that is generated first, and the beacon slot of the device 1, set through the configuration of the beacon table, are shown.

As shown in the drawing, the beacon table includes a field for neighbors' BTTSs, a field for neighbors' neighbors' BTTSs, a depth field, a field for BTTSs to be avoided, and a field for my BTTS.

Since the device 1 is a device that is generated first, the depth thereof is 0. Since the device 1 has no neighbor devices, it does not have information about neighbors' BTTSs and the neighbors' neighbors' BTTSs (indicated by X). Therefore, the device 1 sets the first BTTS, which is the earliest BTTS in the beacon-only period of a superframe, that is, the first beacon slot, as my beacon slot.

In order to set my beacon slot, each device configures the beacon table, as shown in FIG. 12, using beacon scheduling information received from neighbor devices, and then sets my beacon slot.

Figure 13:
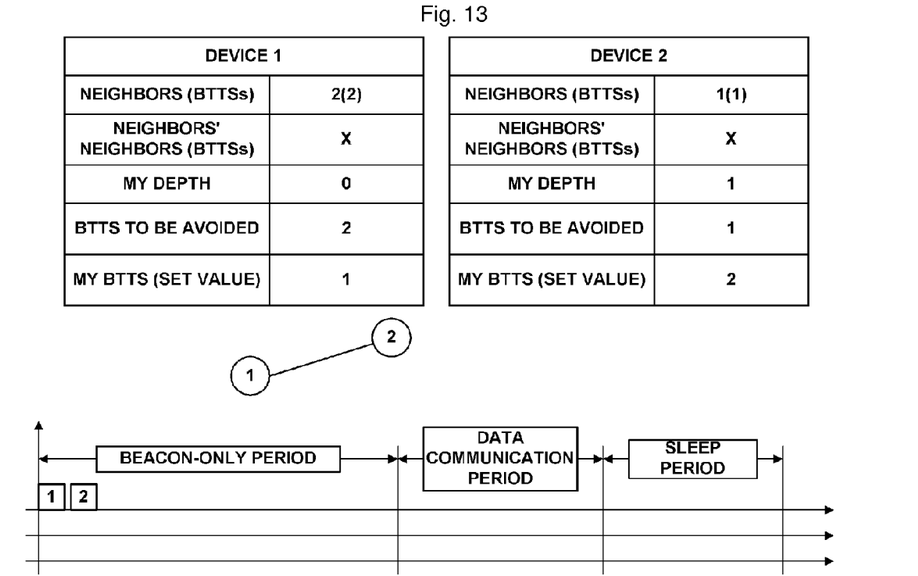
FIG. 13 is a diagram showing a method of setting the beacon slot of a device 2 in the network of FIG. 10.

FIG. 13 is a diagram showing a method of setting the beacon slot of a device 2 in the network of FIG. 10, which shows the forms of the beacon tables of devices 1 and 2 when the device 2 is generated.

First, the device 2 generates a beacon table on the basis of the beacon scheduling information received from the device 1. Since the device 1 is a neighbor device of the device 2, the device 2 sets my BTTS while avoiding the BTTS of the device 1.

Further, the device 1 receives information about the BTTS of the device 2 and updates a field for neighbors' BTTSs and a field for BTTSs to be avoided in the beacon table. Therefore, the table of FIG. 12, managed by the device 1, is updated to the table of FIG. 13. Subsequently, the device that has been previously generated continuously updates the field for neighbors' BTTSs and the field for BTTSs to be avoided in the beacon table thereof on the basis of the beacon scheduling information transmitted from a new neighbor device.

Figure 14:
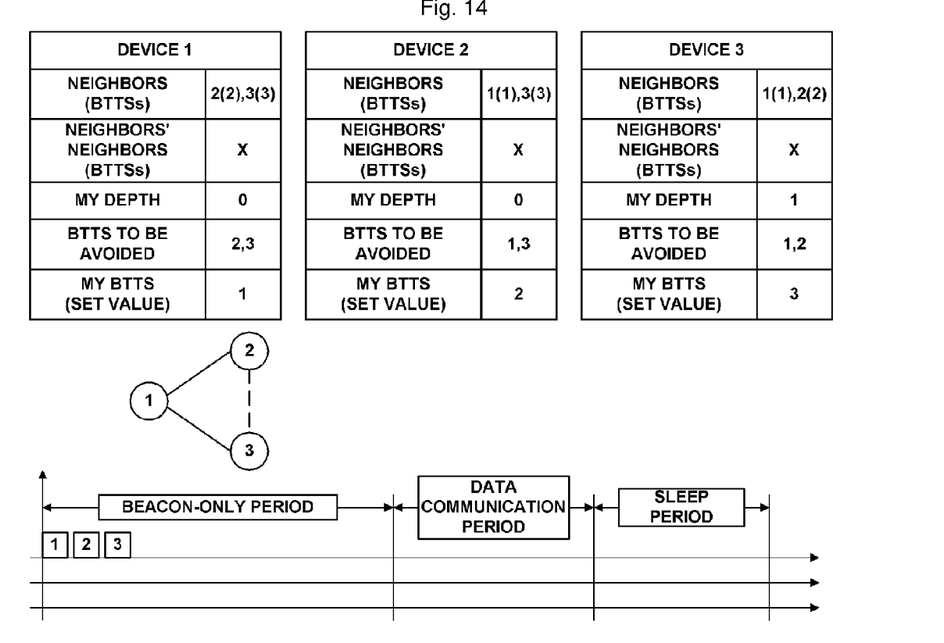
FIG. 14 is a diagram showing a method of setting the beacon slot of a device 3 in the network of FIG. 10.

FIG. 14 is a diagram showing a method of setting the beacon slot of a device 3 in the network of FIG. 10, which shows the forms of devices 1, 2 and 3 when the device 3 is generated.

As shown in the drawing, since the devices 1 and 2 are neighbor devices of the device 3, the device 3 receives beacon scheduling information from the two devices, inputs both the beacon slot information of the device 1 and the beacon slot information of the device 2 into the field for BTTSs to be avoided on the basis of the beacon scheduling information, and sets my BTTS (beacon slot) while avoiding the beacon slots input into the field for BTTSs to be avoided.

That is, the device 3 is aware that the BTTS of the neighbor device 1 is slot 1, and the BTTS of the neighbor device 2 is slot 2, and that there are no devices neighboring the neighbor device 1 and the neighbor device 2, and thus inputs slot 1 and slot 2 into the field for BTTSs to be avoided and sets slot 3 as my beacon slot.

Further, with the generation and connection of the device 3, the devices 1 and 2 also update their beacon tables. Accordingly, the devices 1 and 2 add information about the BTTS of the device 3, which is a new neighbor device, to the fields for neighbors' BTTSs, and input information about the BTTS of the device 3 into the fields for BTTSs to be avoided.

Figure 15:
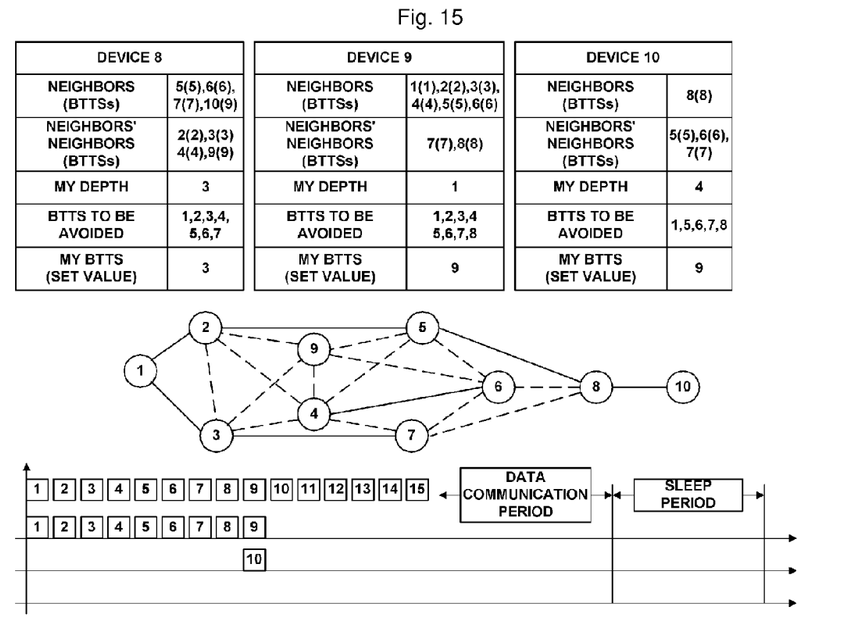
FIG. 15 is a diagram showing a method of setting the beacon slot of a device 10 in the network of FIG. 10.

FIG. 15 is a diagram showing a method of setting the beacon slot of a device 10 in the network of FIG. 10, which shows the forms of the beacon tables of devices 8, 9 and 10 when the devices 8, 9 and 10 are sequentially generated.

As shown in the drawing, in the network in which the device 10 is generated, the device 10 inputs information about the BTTS of the device 8 into the field for neighbors' BTTSs, and inputs information about the BTTSs of the devices 5, 6, and 7, which are the neighbor devices of the device 8, into the field for neighbors' neighbors' BTTSs.

Therefore, the device 10 inputs information about the BTTSs of the devices 5, 6, 7 and 8 into the field for BTTSs to be avoided, on the basis of the field for neighbors' BTTSs and the field for neighbors' neighbors' BTTSs. In this case, the device 1 (coordinator) is not categorized as a neighbor device or as a neighbor's neighbor device, but, when slot 1 is set as a coordinator-only transmission interval, information about the BTTS of the device 1 can be additionally added to the field for BTTSs to be avoided.

Further, the device 10 sets my BTTS with reference to information included in the field for BTTSs to be avoided. In this case, the device 10 can set slot 2, which was used by the device 2 in the beacon-only period, as my beacon slot. However, it is preferable that the device 10 set the ninth BTTS (slot 9), which lags behind the BTTS of the parent device, that is, the device 8, and which is empty, as my BTTS, in order to prevent the delay of a data flow from occurring when the device 10 has a BTTS earlier than that of the parent device.

That is, each device sets my beacon slot among beacon slots of the beacon-only period, except for the neighbors' BTTSs and the neighbors' neighbors' BTTSs, but may set a beacon slot, appearing after the BTTS of the parent device, as my beacon slot.

Meanwhile, with the generation of the device 10, other devices update their own beacon tables. As shown in the drawing, the devices 8 and 9 also configure both the field for neighbors' BTTSs and the field for neighbors' neighbors' BTTSs, detect BTTSs to be avoided by it with reference to the configured fields, and thereafter set their own BTTSs.

Through the above procedure, the devices 9 and 10 consequently use the same BTTS. Since the devices 9 and 10 do not neighbor each other, and do not neighbor the neighbor devices thereof, as shown in FIG. 9, it can be seen that beacon collisions do not occur even if they use the same beacon slot.

Figure 16:
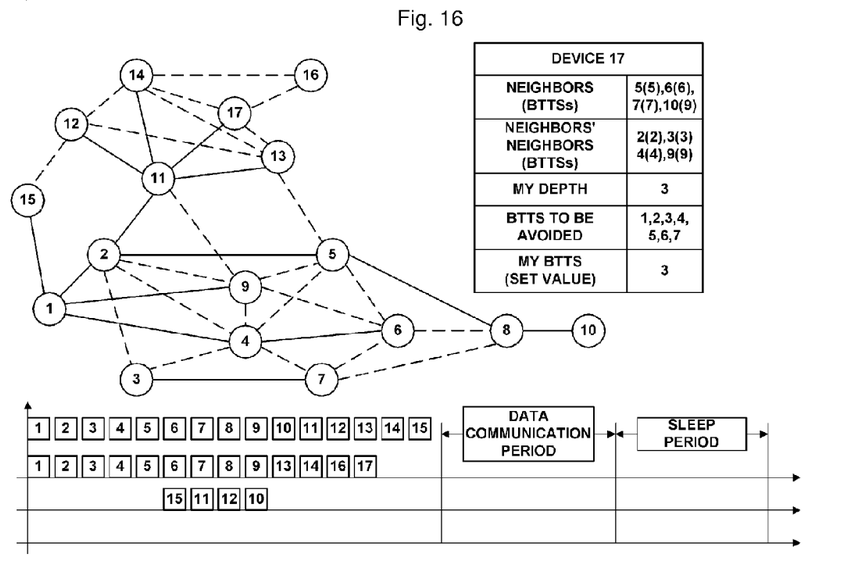
FIG. 16 is a diagram showing a method of setting the beacon slot of a device 17 in the network of FIG. 10.

FIG. 16 is a diagram showing a method of setting the beacon slot of a device 17 in the network of FIG. 10, which shows the case where the device 17 is generated after the devices 11 to 16 are sequentially generated through the above-described procedure.

As shown in the drawing, the device 17 receives beacon scheduling information from neighbor devices, and thus inputs information about the BTTSs of devices 11, 13, 14 and 16, which are neighbor devices thereof, and the BTTSs of devices neighboring the neighbor devices, that is, devices 2, 5, 9 and 12, into the beacon table thereof.

Thereafter, the device 17 inputs information about the neighbors' BTTSs, the neighbors' neighbors' BTTSs, and the BTTS of the coordinator (device 1) into the field for BTTSs to be avoided, and sets my BTTS among empty BTTSs after the BTTS of the device 11, which is the parent node of the device 17. At this time, the device 17 sets my BTTS in the empty BTTSs after the BTTS of the parent node, but may preferably set the first slot, that is, slot 13, which is the earliest slot of beacon slots, as my beacon slot.

Figure 17:
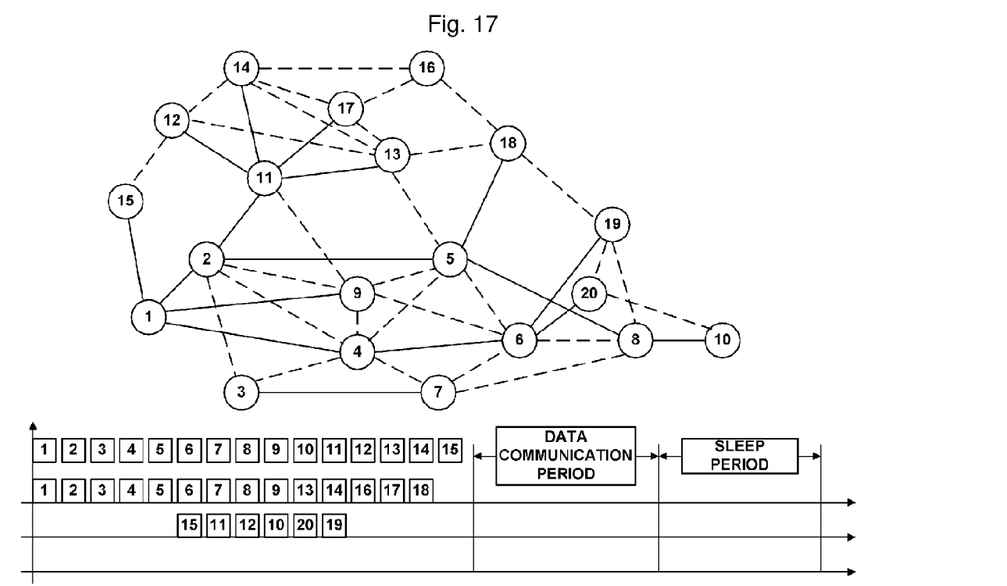
FIG. 17 is a diagram showing the beacon slots of all devices when the network of FIG. 10 is completed.

FIG. 17 is a diagram showing the beacon slots of all devices when the network of FIG. 10 has been completed, which shows that previously allocated slots can be reused within the range in which beacon collisions do not occur, without causing a single beacon slot to be used only by a single device.

That is, according to the above procedure, when all of the devices 1 to 20 join the network, the total number of devices is 20, but the total number of time slots allocated in the beacon-only period is 14 because the reuse of the beacon slots is possible.

Hereinafter, the operating procedures of respective devices in the beacon slot setting method according to the present invention are summarized and described below.

Figure 18:
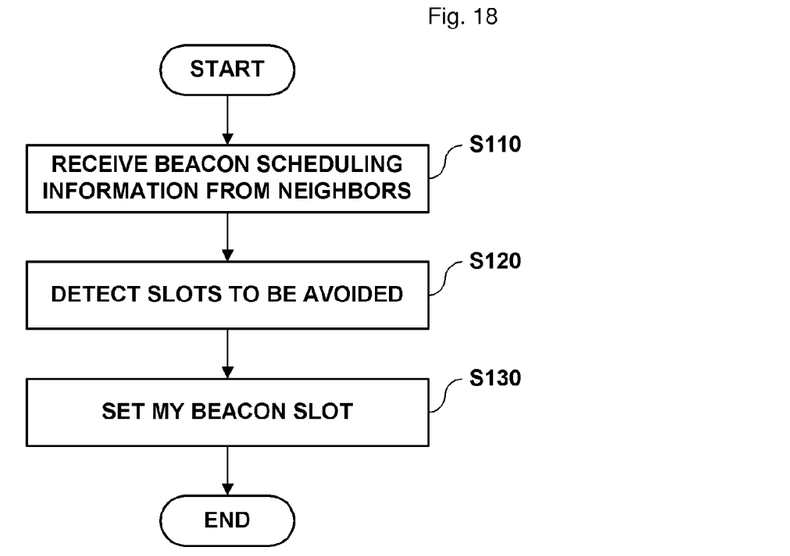
FIG. 18 is a flowchart sequentially showing a beacon table generation procedure in the beacon slot setting method according to an embodiment of the present invention.
Figure 19:
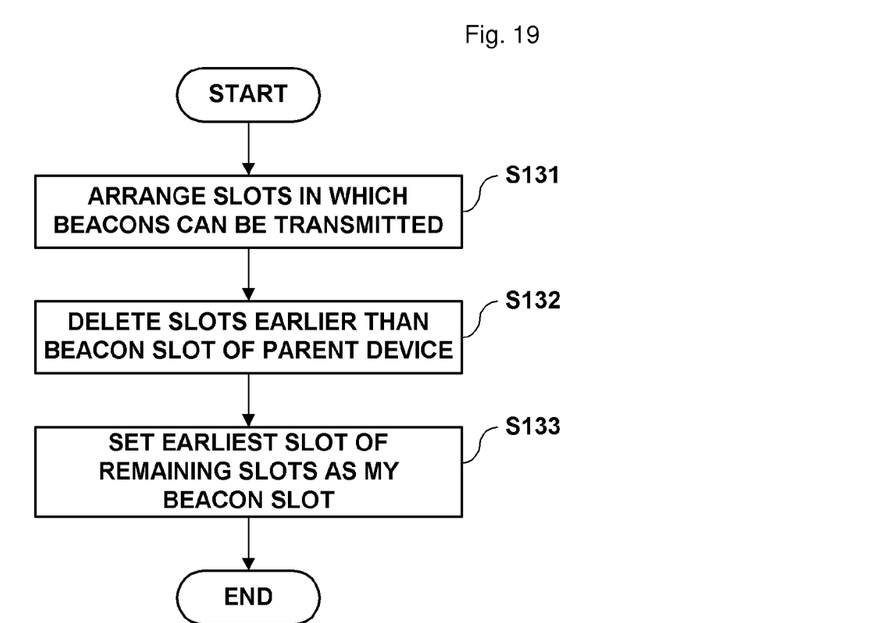
FIG. 19 is a flowchart showing the beacon slot setting procedure of FIG. 18.

FIG. 18 is a flowchart sequentially showing a beacon table generation procedure in the beacon slot setting method according to an embodiment of the present invention, and FIG. 19 is a flowchart showing the beacon slot setting procedure of FIG. 18, and illustrates the operation of a newly generated device.

As shown in the drawings, a newly generated and connected device receives beacon scheduling information from respective neighbor devices at step S110. The received beacon scheduling information includes information about the BTTSs of the neighbor devices, which transmit the beacon scheduling information, the BTTSs of devices neighboring the neighbor devices, and the depths of the devices.

Next, the device, having received the beacon scheduling information from the neighbor devices, detects slots to be avoided by it at the time of transmitting beacons on the basis of the neighbors' BTTSs and the neighbors' neighbors' BTTSs at step S120. That is, step S120 is the step of configuring the content of the field for BTTSs to be avoided, wherein information about the neighbors' BTTSs and the neighbors' neighbors' BTTSs is input into the field, and information about the BTTS, allocated as the coordinator-only interval, and BTTSs earlier than the BTTS of the parent device thereof may be additionally input into the field.

Accordingly, the newly generated device sets my beacon slot among beacon slots of the beacon-only period, except for the coordinator's BTTS, the neighbors' BTTSs, and the neighbors' neighbors' BTTSs, with reference to the field for BTTSs to be avoided at step S130. In this case, the device can set my beacon slot among beacon slots in which the device can transmit beacons, except for slots earlier than the BTTS of the parent node, and may set the earliest slot of the slots as my beacon slot.

That is, as shown in FIG. 19, the newly generated device arranges slots of the beacon-only period, in which beacons can be transmitted, except for BTTSs to be avoided, at step S131, excludes slots earlier than the beacon slot of the parent device so as to improve the efficiency of data transmission at step S132, and sets one of the remaining slots as my beacon slot, but may set the earliest slot of the remaining slots as my beacon slot at step S133.

Meanwhile, the device that has set the beacon slot, as described above, completes my beacon table using information obtained or detected at steps S110 to S130, and maintains the information of the beacon table. The information included in the beacon table includes information about the neighbors' BTTSs, the neighbors' neighbors' BTTSs, my depth, BTTSs to be avoided, my BTTS, etc.

Figure 20:
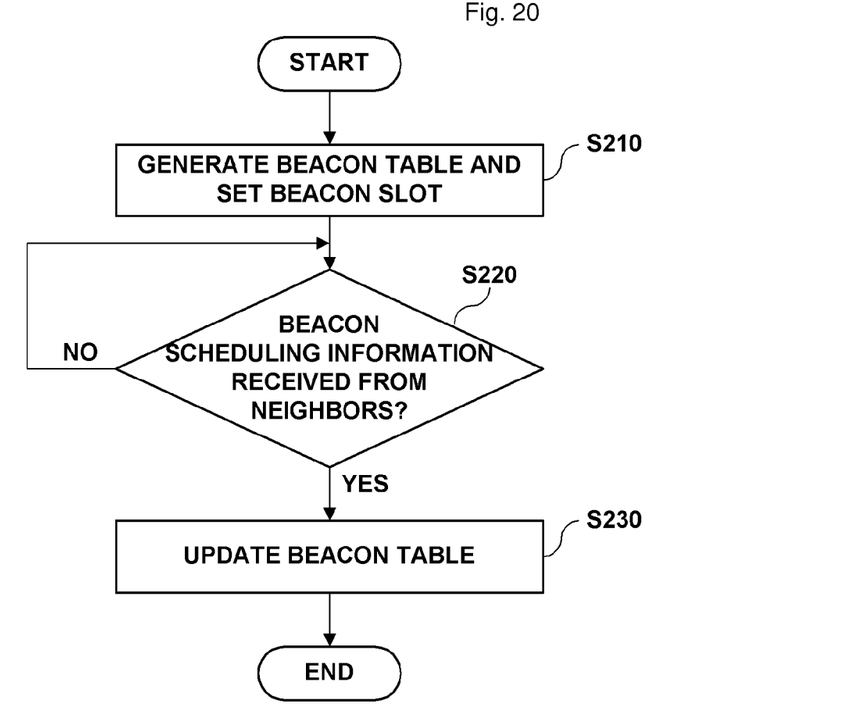
FIG. 20 is a flowchart sequentially showing a beacon table update procedure in the beacon slot setting method according to an embodiment of the present invention.

FIG. 20 is a flowchart sequentially showing a beacon table update procedure in the beacon slot setting method according to an embodiment of the present invention.

As shown in the drawing, each device generates a beacon table and sets my beacon slot through the procedures of FIGS. 18 and 19 at step S210, and updates the information of the beacon table using the beacon scheduling information subsequently received from neighbor devices.

That is, when beacon scheduling information is received from a newly generated neighbor device at step S220, the relevant device adds information about the BTTS of the newly generated neighbor device to the field for neighbors' BTTSs, among the information fields of the beacon table thereof, and adds information about the BTTSs of devices neighboring the newly generated neighbor device to the field for neighbors' neighbors' BTTSs at step S230. Further, although not shown in the drawing, a neighbor's neighbor device may be newly generated, and thus each device can update the field for neighbors' neighbors' BTTSs, using the beacon scheduling information received from previously generated neighbor devices. Accordingly, each device can also update the information of the field for BTTSs to be avoided by it.

The beacon table update procedure (step S230) is a procedure that is required to set the beacon slot of a newly generated device. Since the newly generated device must set my BTTS in consideration of neighbors' neighbors' BTTSs, respective devices must continuously update information about neighbor devices joining the network.

Meanwhile, the beacon slot setting method according to the present invention, as described above with reference to FIGS. 8 to 20, is applied to a WPAN device that uses superframes, each having a beacon-only period.

Figure 21:
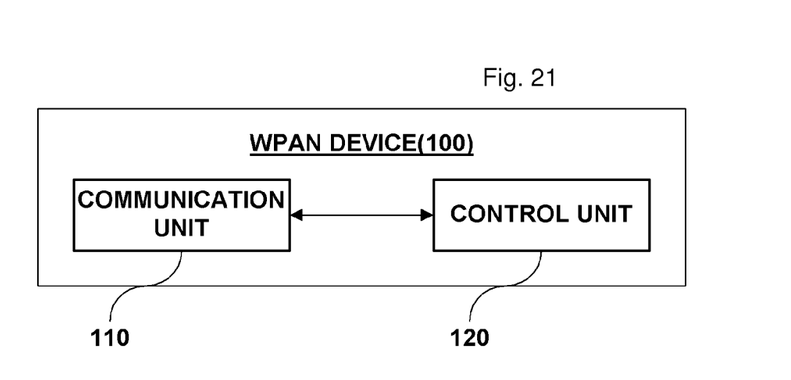
FIG. 21 is a diagram showing a WPAN device according to an embodiment of the present invention.

As shown in FIG. 21, a WPAN device 100 to which the beacon slot setting method of the present invention is applied includes a communication unit 110 for performing the transmission/reception of beacons and data over a WPAN, which uses superframes, each having a beacon-only period during which two or more beacons are transmitted, and a control unit 120 for controlling the communication unit.

The control unit 120 sets my beacon slot among the beacon slots of the beacon-only period, except for neighbors' beacon slots and the neighbors' neighbors' beacon slots, and controls the communication unit 110 so that the beacon is transmitted in the set beacon slot of the beacon-only period.

In this case, the control unit 120 sets my beacon slot, among the slots of the beacon-only period, except for beacon slots earlier than the beacon slot of a parent device, neighbors' beacon slots, and the neighbors' neighbors' beacons slots, but may set the earliest slot of the remaining slots as my beacon slot.

Further, when there is a beacon slot allocated as a coordinator-only transmission interval, the control unit 120 preferably sets my beacon slot among beacon slots, except for the beacon slot of the coordinator.

Meanwhile, in order to allow neighbor devices to set their own beacon slots, the control unit 120 controls the communication unit 110 so that beacon scheduling information, including information about my beacon slot and neighbors' beacon slots, is transmitted to the neighbor devices.

Since those skilled in the art can implement the present invention in other preferred embodiments without changing the technical spirit or essential features thereof, it should be understood that the above-described embodiments are not intended to limit the present invention, and are intended to exemplify the present invention in all aspects. The scope of the present invention is defined by the accompanying claims rather than the above detailed description, and the meaning and scope of the claims and all changes or modifications derived from equivalents thereof should be interpreted as being included within the scope of the present invention.

Industrial Applicability

As described above, the present invention can be applied to a WPAN device for performing wireless personal area communication between devices over a WPAN, which uses superframes, each having a beacon-only period during which two or more beacons are transmitted, and can be utilized to enable the BTTSs of other devices to be reused without causing collisions between beacons.

The invention claimed is:

1. A method of setting a beacon slot in a WPAN device by using beacon slot information of neighbors of the WPAN device and its neighbors' of each such neighbors and using a beacon table in the WPAN which uses superframes each having a beacon-only period during which two or more beacons are transmitted, comprising the steps of:

receiving beacon slot information from one or more neighbors of the WPAN device and beacon slot information from neighbors of each such neighbor with the beacon slot information being obtained from payload information of beacons transmitted from both the neighbors of the WPAN device and from the neighbors of each such neighbor;

wherein the WPAN device obtains the beacon slot information of the one or more neighbors from the payload information of the beacon transmitted from said one or more neighbors;

using the obtained beacon slot information transmitted from the one or more neighbors of the WPAN device to further transmit by the WPAN device to said one or more neighbors a request to identify the neighbors of each such neighbor who have beacon slot information;

wherein said one or more neighbors receives the beacon slot information transmitted of the neighbors of each such neighbor device from the payload information of beacons transmitted from the neighbors of each such said neighbor;

wherein the WPAN device receives the beacon slot information of said neighbors of each such neighbor in a response frame from said one or more neighbor devices with said one or more neighbor devices transmitting the obtained beacon slot information of the neighbors of each such neighbor to the WPAN device in response to the request;

excluding beacon slots, earlier than a beacon slot of a parent device from all of the beacon slots received, which are not the beacon slots to avoid;

setting the beacon slot in the WPAN device, from all of the received beacon slots which have beacon-only period except for excluded beacon slots based upon following the additional steps of:

arranging beacon slots of the beacon-only period except for excluded beacon slots; and setting the earliest slot among beacon slots remaining in the beacon-only period as the beacon slot of the WPAN device after excluding the beacon slots earlier than a beacon slot of a parent device from all of the beacon slots received including the receipt of beacon slot information of all the neighbors and after excluding a beacon slot of a coordinator.

2. The method according to claim 1, wherein the setting of the earliest slot among beacon slots follows the receipt of beacon slot information of all the neighbors in response to the request and follows updating the beacon slot information of neighbors inputted into the beacon table.

3. The method according to claim 1, further comprising the steps of:
   transmitting the beacon slot information received from the neighbors contained in a beacon payload; and
   receiving a request for the beacon slot information of its neighbors from a new neighbor, and transmitting beacon slot information to the new neighbor in response to the request.

4. A Wireless Personal Area Network (WPAN) device, including a beacon table in the WPAN which uses superframes each having a beacon-only period during which two or more beacons are transmitted, comprising:
   a communication unit for performing transmission and reception of beacons and data; and
   a control unit for receiving, from one or more neighbors, beacon slot information of the neighbors and the neighbors' one or more neighbors through the communication unit, excluding beacon slots, from all of the beacon slots received, earlier than a beacon slot of a parent device which are not the beacon slots to avoid and excluding a beacon slot of a coordinator and setting the earliest beacon slot among beacon slots remaining in the beacon-only period after the exclusion of beacon slots as the beacon slot of the WPAN device;
   wherein the control unit obtains the beacon slot information of the one or more neighbors from payload information of beacons transmitted from the one or more neighbors and transmits, to the one or more neighbors, through the communication unit, its beacon slot information and its neighbors beacon slot information along with a request for the beacon slot information of the neighbors' neighbors through the communication unit;
   and receives a response frame to the request including the beacon slot information of the neighbor's neighbors wherein said one or more neighbors receives the beacon slot information of the neighbors' neighbors from the beacon payload information transmitted from the neighbor's neighbor wherein said one or more neighbors transmits the obtained beacon slot information of said neighbor's neighbor to the WPAN device in response to the request;
   wherein the control unit sets its beacon slot among beacon slots of the beacon-only period, except for a beacon slot of a coordinator and the beacon slots of its neighbors and its neighbors' neighbors, and
   wherein the control unit receives, through the communication unit, a request for the beacon slot information of its neighbors from a new neighbor; and transmits, through the communication unit, a response to the request including the beacon slot information of its neighbors to the new neighbor.

* * * * *